United States Patent [19]

Niggemann et al.

[11] Patent Number: 5,526,264
[45] Date of Patent: Jun. 11, 1996

[54] ANTI-LOCK BRAKE CONTROL SYSTEM

[75] Inventors: Detlef Niggemann, Steinhausen; Werner Wiegmann, Lippstadt; Harald Bestmann, Nassau; Günther Heinz, Ochtendung; Michael Keller, Traisen; Detlef Staufenbiel, Koblenz; Konrad Schneider, Horhausen, all of Germany

[73] Assignees: Hella KG Hueck Co., Lippstadt, Germany; Lucas Industries publ. ltd. & co., Solihull, Great Britain

[21] Appl. No.: 909,203

[22] Filed: Jul. 6, 1992

[30] Foreign Application Priority Data

Jul. 3, 1991 [DE] Germany ........................ 41 22 016.1

[51] Int. Cl.$^6$ ........................... B60T 8/32; B60T 8/38
[52] U.S. Cl. ........................ 364/426.02; 364/426.03; 303/122.07; 303/122.05
[58] Field of Search ........................ 364/426.02, 426.05, 364/426.03; 73/121; 371/68; 303/122.07, 122.05

[56] References Cited

U.S. PATENT DOCUMENTS

| | | | |
|---|---|---|---|
| 3,829,668 | 8/1974 | Noumi et al. | 235/153 |
| 4,092,853 | 6/1978 | Schneider et al. | 73/121 |
| 4,338,667 | 7/1982 | Cook et al. | 364/426.02 |
| 4,491,919 | 1/1985 | Leiber | 364/426.02 |
| 4,493,210 | 1/1985 | Fries et al. | 73/121 |
| 4,546,437 | 10/1985 | Bleckmann et al. | 364/426.02 |
| 4,700,304 | 10/1987 | Byrne et al. | 364/426.02 |
| 4,709,341 | 11/1987 | Matsuda | 364/550 |
| 4,773,072 | 9/1988 | Fennel | 371/68 |
| 4,999,730 | 3/1991 | Pickard | 361/59 |
| 5,099,443 | 3/1992 | Higashimata et al. | 364/426.02 |
| 5,193,887 | 3/1993 | Bleckmann et al. | 364/426.02 |

FOREIGN PATENT DOCUMENTS

| | | | |
|---|---|---|---|
| 0175843A2 | 2/1986 | European Pat. Off. | B60R 16/02 |
| 0328082A2 | 8/1989 | European Pat. Off. | B60T 8/32 |
| 2253867 | 5/1974 | Germany | B60T 8/02 |
| 3234637A2 | 3/1984 | Germany | B60T 8/02 |
| 3234637 | 3/1984 | Germany | B60T 8/88 |

OTHER PUBLICATIONS

J. Gersteumeier, "Traction Control (ASR)—An Extension of the Anti-Lock Braking System (ABS)", Oct. 86.

*Primary Examiner*—Kevin J. Teska
*Assistant Examiner*—Thai Phan
*Attorney, Agent, or Firm*—Griffin, Butler, Whisenhunt & Kurtossy

[57] ABSTRACT

An anti-lock brake control system comprises at least two micro-computers and at least two input/output circuits which monitor one another as well as functions of other components of the anti-lock brake control system. If faulty voltages appear within the anti-lock brake control system or if false values in transmitted signals occur, the anti-lock brake control system will be dependably shut down. By integrating a plurality of monitoring functions in the input/output circuits as well as by building redundancies into the anti-lock brake control system, a high level of safety is achieved, in spite of the small number of necessary components and the small production cost associated therewith.

36 Claims, 3 Drawing Sheets

ANTI-LOCK BRAKE CONTROL SYSTEM

BACKGROUND OF THE INVENTION

The invention relates generally to an anti-lock brake control system comprising at least two micro-computers which are fed the same rpm-signals, and which analyze these signals independently of one another, produce control signals from the rpm-signals, compare the control signals and produce a fault signal and/or a blocking signal upon any disagreement, or incongruence, between the control signals.

For apparatus which are particularly critical in safety matters, as is the case with anti-lock brake control systems, it is known and customary to provide a redundant structure, that is, to provide multiple parts pertinent to functional safety and to have them work in parallel so that the parts of the apparatus can "back up" one another with respect to the various functions.

Such a redundantly structured, self-controlling anti-lock brake control system is described in German patent document DE-PS 32 34 637.

In this apparatus, specially processed wheel-sensing signals are fed to two one-chip micro-computers arranged in parallel. From the sensed signals these micro-computers compute valve control signals and control signals. Each micro-computer is arranged with a comparator with both comparators being fed the control signals of both micro-computers as well as a computed valve driver signal of a respective micro-computer. Further, one comparator receives the control signal of the other micro-computer while the other comparator, after a gain adjustment, is fed a valve driver signal monitored at a magnetic valve. Upon a disagreement of valve control signals, that is, valve control signals and valve driver signals, or the control signals, a fault is detected. Each comparator can switch off the entire anti-lock brake control system or parts thereof via a governing stage and a relay.

This arrangement is unnecessarily cost-intensive, in particular due to the comparators. When these are included, either two unnecessary components are in the circuit which cost money and use space or, if each comparator is integrated into its micro-computer to form one module as suggested, high development expenses must be invested for this special module. At least a higher price must be paid for this module as compared to that for a micro-computer module.

In a further embodiment, logical circuit units (micro-computer and comparator) are each arranged with a monitoring and control circuit, which monitors and controls an impulse interval frequency of a corresponding switching circuit unit as well as a battery voltage of a vehicle. These monitoring and controlling circuits have proven to be relatively complicated and specialized modules in particular, because they must control the timing behavior of the anti-lock brake control system.

It is an object of this invention to provide a redundantly structured anti-lock brake control system which offers a maximum of safety while being constructed as uncomplicatedly and efficiently as possible and which, therefore, may be manufactured particularly cost-effectively.

SUMMARY

According to principles of this invention, an anti-lock brake control system comprises at least two input/output circuits which monitor given signal transfers of micro-computers as well as at least one further electrical value or factor of the anti-lock brake control system, with each of the input/output circuits being able to switch off at least portions of the anti-lock brake control system upon the occurrence of fault signals and/or blocking signals from at least one of the micro-computers at one of the input/output circuits or upon the occurrence of a fault value of the monitored electrical value.

The micro-computers are linked via a communication bus comprising parallel data lines by means of which they exchange control signals computed from supplied rpm-signals and compare them with respect to agreement, or congruency. That is, comparison of the control signals is done within the micro-computers. Special comparator circuits or logic circuit units comprising a comparator circuit are not needed. Uncomplicated commercial one-chip micro-computers are completely sufficient for this purpose, which has positive effects on costs and operation safety of the anti-lock brake control system.

In addition, the at least two input/output circuits link peripheral components of the anti-lock brake control system. The input/output circuits, built as integrated modules, comprise, from a circuit-technology point of view, basically relatively uncomplicated components, such as gain-adjustment, or calibration, circuits, window comparators, low-pass filters for interference-impulse suppression etc.

BRIEF DESCRIPTION OF THE DRAWINGS

One embodiment of the anti-lock control system is depicted in the drawings and will be further explained by means of the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Various circuit parts are depicted as rectangles. Produced or received signals from or by input/output circuits (EAS1, EAS 2, EAS) are depicted by rectangles with prominent, or bold, outlines. Paths by voltages and signals are depicted by lines, wherein signal directions, that is, directions from senders to respective receivers, are shown by arrows.

Figure 1:
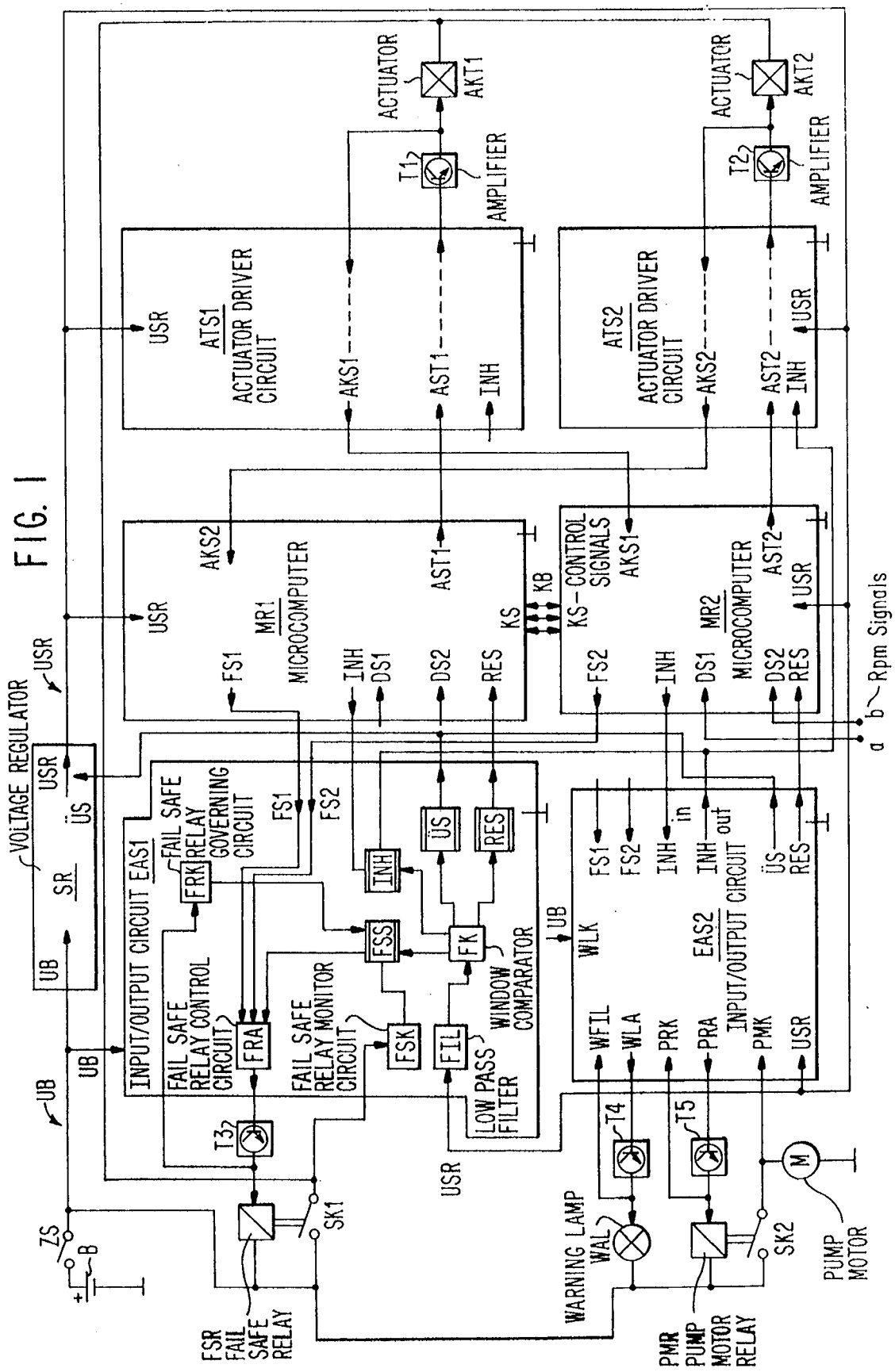
FIGS. 1 and 2 are schematically simplified block diagrams of an anti-lock brake control system of this invention with the part depicted in FIG. 1 being linked to the part depicted in FIG. 2 of the anti-lock brake control system via terminals a and b.
Figure 2:
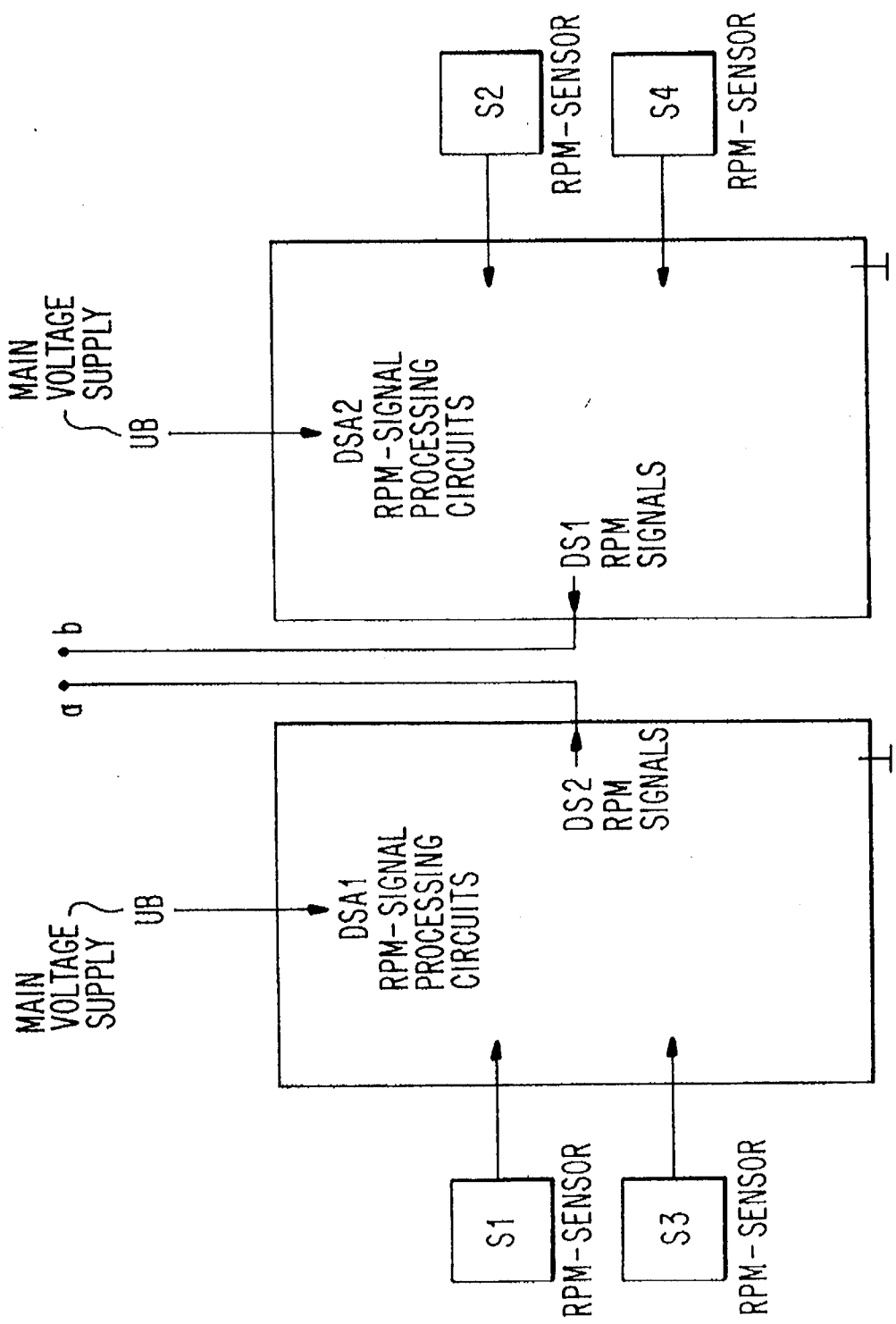

FIGS. 1 and 2 depict an anti-lock brake control system of this invention. Since the following explanations mainly describe elements relating to safe operation, FIGS. 1 and 2 depict components which generally are part of known anti-lock brake control systems, and, because their construction is generally known, they are only represented schematically here.

Further, some multiple devices, terminals and electrical connections are shown as singles to keep the drawings clearer. In addition, components and their cooperation, which are part of the input/output circuits EAS1, EAS2, are depicted in a simplified manner. An explicit description is given in FIG. 3.

Rpm-signals DS1 and DS2 produced by rpm-sensors S1–S4 are processed in rpm-signal processing circuits DSA1 and DSA2 and transferred by these simultaneously to micro-computers MR1, MR2 via parallel or serial rpm-signal lines. The micro-computers MR1, MR2 check the received rpm-signals DS1, DS2 for plausibility and compute actuator governing signals AST1, AST2 for controlling actuator driver circuits ATS1, ATS2 and transmit these to the respectively arranged actuator driver circuits ATS1, ATS2 via actuator control lines. That is, the actuator driver circuit ATS1 receives, for example, from the micro-computer MR1, the actuator governing signal AST1 for activating actuators, which preferably are magnetic valves and are connected to rear left and front right wheels. The actuator driver circuit ATS2 controls accordingly an opposite diagonal with the actuator governing signal AST2 received from the micro-computer MR2.

Each diagonal has four actuators with their respective switch amplifiers, with each wheel having one actuator for releasing hydraulic pressure and one actuator for maintaining it. For purposes of clarity, FIG. 1 shows, for each diagonal, only one of the four actuators as an example, with each actuator AKT1, AKT2 having one switch amplifier T1, T2.

Each of the micro-computers MR1, MR2 not only calculates control signals of its associated diagonal, but also those of the other diagonal.

Both micro-computers MR1, MR2 can, via a communication bus KB comprising several data lines, exchange the actuator governing signals AST1, AST2 calculated by them, or signals derived therefrom as control signals KS and check them for agreement, or congruency. Further, each micro-computer MR1, MR2 compares the actuator governing signals AST2, AST1 applied to the actuators AKT2, AKT1 of the opposite diagonal with the computed control signals for its diagonal. For this purpose, the control signals produced as actuator control signals AKS2, AKS1 by the respective switch amplifiers T2, T1 are each transmitted to the micro-computer MR1, MR2 of the opposite diagonal via the respective actuator driver circuit ATS2, ATS1, acting as a gain, or level, converter.

The micro-computers MR1, MR2 interpret herein each disagreement during these comparisons as malfunctions and transmit corresponding fault signals FS1, FS2 to both input/output circuits EAS1, EAS2.

This leads to a "turn-off" of major portions of the anti-lock brake control system. If an FS1 signal from the micro-computer MR1, or an FS2 signal from micro-computer MR2, or both signals, are transmitted to the input/output circuit EAS1, the input/output circuit EAS1 turns off a fail safe relay FSR via a fail safe relay control circuit FRA and a switch amplifier T3. Thereby, a supply voltage of all actuators AKT1, AKT2 is turned off wherein a brake system is reduced to braking without support by the anti-lock brake control system.

Applying the fault signal FS1 and/or the fault signal FS2 to the input/output circuit EAS2 results in engaging a warning lamp WAL as well as turning off a pump motor relay PMR so that a pump motor, controlled by the pump motor relay PMR, cannot build up pressure in a hydraulic system.

Further, one, or both, of the micro-computers MR1, MR2, requests, via a blocking signal input port $INH_{in}$ of at least one of the input/output circuits EAS1, EAS2, the emission of a blocking signal INH from at least one input/output circuit EAS1, EAS2 via a blocking signal output port $INH_{out}$ to both actuator driver circuits ATS1, ATS2, which thereby do not transmit actuator governing signals AST1, AST2, received from the micro-computers MR1, MR2, to the amplifiers T1, T2 for controlling the actuators AKT1, AKT2.

Thereby, the actuators AKT1, AKT2 are blocked from use upon occurrence of faulty actuator governing signals AST1, AST2, actuator control signals AKS1, AKS2 and/or control signals KS in two ways.

It is noteworthy that a remaining portion of the circuit continues to function. In particular, the micro-computers MR1, MR2 continue to process rpm-signals DS1, DS2 supplied them so that as soon as the micro-computers MR1, MR2 redetermine the correctness of computed actuator-governing signals AST1, AST2, the actuator control signals AKS1, AKS2 and the control signals KS, the anti-lock brake control system resumes its function. It is important that with lasting disagreement of the actuator governing signals AST1, AST2, the actuator control signals AKS1, AKS2 and/or the control signals KS, the anti-lock brake control system effectively remains turned off. Also, it may be provided by software, of course, that upon the occurrence of faulty signals, in particular repetitive occurrences, the system is not allowed to reenter an active mode.

Effects of faulty voltage conditions may be much more critical within the anti-lock brake control system, in particular when they concern power supply of the particularly voltage-sensitive micro-computers MR1, MR2. Here, the effects of voltage faults can turn into functional disturbances and, in a worst case, even destruction of the micro-computers MR1, MR2.

Therefore, the micro-computers MR1, MR2 and the actuator driver circuits ATS1, ATS2, directly connected with them, are supplied via a voltage regulator SR with a typical operating voltage USR of 5 volts, which is not unusual for computer circuits.

The input/output circuits EAS1, EAS2 continuously and independently from one another monitor the operating voltage USR of the micro-computers MR1, MR2 and the actuator driver circuits ATS1, ATS2. The voltage USR produced by the voltage regulator SR is applied to an input of each of the input/output circuits EAS1, EAS2. The input/output circuits EAS1, EAS2 work independently from the voltage USR produced by the voltage regulator SR and are supplied from a main voltage supply UB of the motor vehicle. Each of the input/output circuits EAS1, EAS2 includes an internal low-pass filter FIL for filtering out interference voltages and voltage peaks. A window comparator FK is arranged in series after each low-pass filter FIL. If both input/output circuits EAS1, EAS2 register a voltage USR outside a window range of the window comparators lasting longer than a filter time period, each of the input/output circuits EAS1, EAS2 transmits a reset signal RES to the corresponding micro-computer MR1, MR2. This function is executed redundantly. If only one of the micro-computers MR1, MR2 receives a reset signal RES, the corresponding other micro-computer MR2, MR1 will register a fault while performing comparisons because of faulty or missing actuator governing signals AST1, AST2, actuator control signals AKS1, AKS2 and/or control signals KS.

On a basis of these conditions, the micro-computers MR1, MR2 will stop governing the actuator driver circuits ATS1, ATS2 and instead transmit a fault signal FS1, FS2 to the input/output circuits EAS1, EAS2; each of the micro-computers MR1, MR2 transmits its own fault signal FS1, FS2 to both input/output circuits EAS1, EAS2. That is, one of the fault signals FS1, FS2 is sufficient for the input/output circuit EAS1 so that the input/output circuit EAS1 turns off the fail safe relay FSR via a switch amplifier T3 connected with an outport thereof. The voltage supply of the actuators AKT1, AKT2 is transmitted through a switch contact SK1 of the fail safe relay FSR so that at a turn-off of the fail safe relay FSR the voltage supply of the actuators AKT1, AKT2 is also turned off.

An FS1 or FS2 signal at the input/output circuit EAS2 results, via the switch amplifier T5, in a corresponding turning off of the pump motor relay PMR and thereby, via the circuit contact SK2, a turning off of a hydraulic-pressure-producing pump motor PM. Also, the input/output circuit EAS2 switches the warning lamp WAL on by means of a switch amplifier T4 in order to inform the driver of the motor vehicle of a non-availability of the anti-lock brake control system.

Further, each of the micro-computers MR1, MR2 commands, via the blocking signal input port $INH_{in}$, the emission of a blocking signal INH from the input/output circuit EAS1, EAS2 assigned to it. The respective input/output circuit EAS1, EAS2 then emits a blocking signal INH via its blocking signal output port $INH_{out}$ to the actuator driver circuits ATS1, ATS2, thereby blocking governing of the switch amplifiers T1, T2, arranged downstream of the actuator driver circuits ATS1, ATS2, for activating the actuators AKT1, AKT2.

In general, that is with correct functioning of both input/output circuits EAS1, EAS2, both input/output circuits EAS1, EAS2 emit a blocking signal INH at their blocking signal output ports $INH_{out}$. For blocking the actuator driver circuits ATS1, ATS2 it is sufficient, however, if one of the two input/output circuits EAS1, EAS2 emits a blocking signal INH. Turning off the actuator driver circuits ATS1, ATS2 by means of a blocking signal INH of the input/output circuits EAS1, EAS2 is herein arranged in a redundant manner for increasing safety.

Independently from respective commands by the micro-computers MR1, MR2, at least one of the two input/output circuits EAS1, EAS2 produces, at the occurrence of a voltage fault, in addition to the reset signal RES also a fail safe signal FSS and the blocking signal INH.

Thus, a plurality of independently working devices are provided in case of a voltage fault for preventing engagement of the actuators AKT1, AKT2 in a reliable manner.

Much more critical than low voltage tension is an excessive voltage USR, since it can lead to destruction, particularly of the micro-computers MR1, MR2. The input/output circuits EAS1, EAS2 are therefore constructed such that each of them, at the occurrence of a voltage USR above a level UFO predetermined by the window comparator FK, can produce an excess-voltage signal ÜS. The voltage regulator SR is constructed such that it turns off its output voltage USR when being governed by a logical signal, such as for example the excess-voltage signal ÜS. If at least one of the input/output circuits EAS1, EAS2 emits an excess-voltage signal ÜS to the voltage regulator SR, the voltage regulator SR interrupts the voltage supply of the components (MR1, MR2, ATS1, ATS2) in addition to the above described measures.

The at least one input/output circuit EAS1, EAS2, which produces the excess-voltage signal ÜS and the reset signal RES, stores them until the turning off of the main voltage supply UB. Thereby, reactivation of supply of the components (MR1, MR2, ATS1, ATS2) with excess voltage USR is prevented, at least until the anti-lock brake control system is separated from the vehicle main power supply B by operation of the ignition switch ZS. Choosing an appropriate upper window range voltage UFO of the window comparators FK within the input/output circuits EAS1, EAS2 allows turning off, in cases of excess voltages USR, of the voltage supply of the micro-computers MR1, MR2 and the actuator driver circuits ATS1, ATS2 before destruction of these components.

Thus, a further measure for safety purposes is provided, increasing operational safety of the anti-lock brake control system by allowing the switching-off the voltage regulator SR by means of an excess-voltage signal ÜS, in addition to the turning off of the actuator supply voltage by means of the fail safe relay FSR, the blocking of the micro-computers MR1, MR2 by means of a reset signal RES, and the blocking of the actuator driver circuits ATS1, ATS2 by means of a blocking signal INH, as well as by the presence of multiple major monitoring devices, in particular of the input/output circuits EAS1, EAS2 and the micro-computers MR1, MR2.

The cooperation of a plurality of various, controlling functions and signals, independent from one another, prevents, with high accuracy, activation of the actuators at the occurrence of malfunction conditions within the anti-lock brake control system.

This very high level of safety is achieved, as FIGS. 1 and 2 show, by means of a relatively small number of modules, or components, despite the fact that some of the modules are doubled and some functions are executed redundantly.

For further increase of reliability, additional control of the individual modules of the anti-lock brake control system is provided, although the anti-lock brake control system recognizes faulty conditions by means of the above-mentioned measures and reliably turns off the actuators in case of failure of only one or even several modules of the anti-lock brake control system.

In this regard, a fail safe relay governing circuit FRK within the input/output circuit EAS1 monitors and controls current flowing through the fail safe relay FSR. This can, for example, be achieved by having the fail safe relay governing circuit FRK constructed as a regulating circuit for regulating the strength of the current through the fail safe relay, controlled by the switch amplifier T3, to a given value. A particularly uncomplicated relay-current control is achieved by measuring the relay current via the voltage drop at a resistor of a switch amplifier T3 and by monitoring this voltage drop by a window comparator integrated into the fail safe relay governing circuit FRK.

Further, control of the functioning of the fail safe relay switch contacts SK1 is provided in addition to controlling the flow of current into the fail safe relay FSR. That is, the main voltage supply UB for the actuators AKT1, AKT2, applied via the switch contact SK1 of the fail safe relay FSR, is monitored and controlled by a fail safe relay contact control circuit FSK within the input/output circuit EAS1, thus determining the switched status of the fail safe relay FSR.

The input/output circuit EAS2 is identical in structure and function to the described input/output circuit EAS1 but instead of the fail safe relay FSR a warning lamp WAL and a pump motor relay PMR are monitored and controlled.

Since the integrated circuit components in the input/output circuit EAS2 deviate only in a few of their names from those of the input/output circuit EAS1, the controlling or controlled circuit components of the input/output circuit EAS2 in FIG. 1 are only depicted using their abbreviations.

The cooperation of these circuit components (for both input/output circuits EAS1, EAS2) will be described below using FIG. 3.

In the depicted embodiment, the warning lamp WAL is governed by a warning lamp governing circuit WLA of the input/output circuit EAS2 via a switch amplifier T4. A voltage proportionate to a warning lamp current is read across a resistor, as part of the switch amplifier T4 and not depicted in FIG. 1, and is applied to warning lamp control circuit WLK of the input/output circuit EAS2 via a low-pass filter WFIL, which filters short-termed voltage peaks generated by an increased "switch-on" current of the warning lamp WAL. In cases of excess current, for example in a short circuit, the warning lamp governing circuit WLA promptly turns off the warning lamp WAL in order to protect the remaining electronics. The warning lamp control circuit WLK also recognizes a faulty or missing warning lamp WAL, particularly during an attempt to control the warning lamp WAL upon malfunction. Since the driver cannot be informed about the malfunctioning anti-lock brake control system in this case, it is advisable to effect a total turn-off of the anti-lock brake control system by, for example, having the input/output circuit EAS2 emit a reset signal RES and a blocking signal INH. Since the warning lamp WAL is generally governed together with the fail safe relay FSR, a detection of a warning lamp malfunction by the input/output circuit EAS2 is determined at a moment when the actuators AKT1, AKT2 are turned off in any case.

In an effort to prevent recognition of certain malfunctions only after an engagement of the anti-lock brake control system, the anti-lock brake control system performs an automatic function check of its various modules in relatively short-timed intervals, preferably at each start of the motor vehicle. That is, the micro-computers MR1, MR2, send signals, in particular by means of the input/output circuits EAS1, EAS2, to various components of the anti-lock brake control system, such as the fail safe relay FSR, the pump motor relay PMR, the pump motor PM and the warning lamp WAL. By means of returned signals of monitoring devices, correct functioning of these components can be determined. During such a function check, the driver will also be able to notice non-functioning of the warning lamp WAL at the latest. Monitoring of the actuators AKT1, AKT2 and the actuator driver circuits ATS1, ATS2 is done in a similar manner. For this purpose, each micro-computer MR1, MR2 transmits an actuator control signal for the actuators AKT1, AKT2 to the actuator driver circuits ATS1, ATS2. The control signals AKS1, AKS2, monitored at the actuators AKT1, AKT2, are transmitted to the respective other micro-computer MR2, MR1 via the corresponding actuator driver circuits ATS1, ATS2. In this manner, already at the beginning of a drive with a vehicle, it can be checked whether all components of the anti-lock brake control system are in an operationally safe condition.

The already mentioned pump motor PM represents a very safety-relevant component of the anti-lock brake control system. This pump motor provides a pressure build-up in the hydraulic brake system and must be turned on and function flawlessly at the latest at the beginning of an anti-lock braking process in order to rebuild the brake pressure lowered by the anti-lock brake control system. The pump motor PM is engaged via the circuit contact SK2 of the pump motor relay PMR. The pump motor relay PMR is monitored and controlled in the same manner by means of the input/output circuit EAS2 as is the fail safe relay FSR by means of the input/output module EAS1. That is, the pump motor relay PMR is governed by means of a pump motor relay governing circuit PRA of the input/output module EAS2 via the switch amplifier T5. A pump motor relay control circuit PRK of the input/output module EAS2 monitors or controls the strength of a current flowing through the pump motor relay PMR. The pump motor control circuit PMK of the input/output circuit EAS2 monitors a voltage applied to the pump motor PM via the switch contact SK2 of the pump motor relay PMR. By these means, the input/output circuit EAS2 controls continuously both, the circuit condition of the pump motor relay PMR as well as the functioning capability of the pump motor PM.

Figure 3:
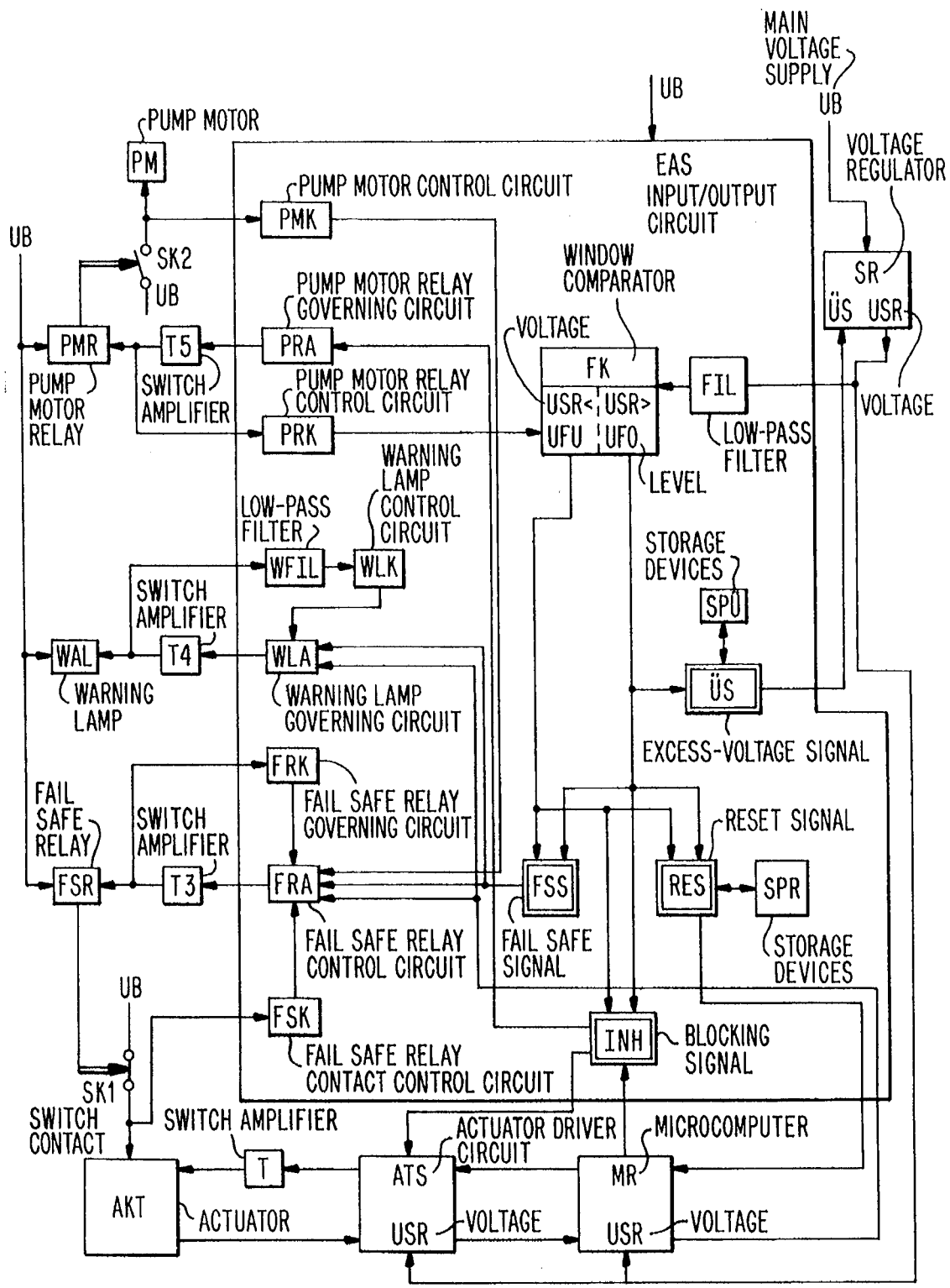
FIG. 3 is a block diagram of a portion at the invention illustrating major functions of the anti-lock brake control system of this invention.

The plurality of the control functions and cooperation of various components of the anti-lock brake control system as well as signals exchanged between the components are depicted in FIG. 3, which is a partial view of the anti-lock brake control system. Herein, a major component is an input/output circuit EAS which is part of the larger circuits of both input/output circuits EAS1, EAS2.

It should be noted that FIG. 3 only provides an overview of various functions of the anti-lock brake control system. Herein, the redundant construction of the anti-lock brake control system is not considered; in particular, cooperation of depicted portions with components of not-depicted portions of the anti-lock brake control system, that is in particular also cooperation of both micro-computers, is not considered. As providing a general overview, FIG. 3, in contrast to FIG. 1, does not divide various control functions among the two input/output circuits.

The input/output circuit EAS, the voltage regulator SR as well as the actuator AKT are supplied with the main voltage supply UB of the motor vehicle. The voltage regulator SR provides, from the main voltage supply UB the voltage USR required for supplying the micro-computer MR and the actuator driver circuit ATS.

The low-pass filter FIL belonging to the input/output circuit EAS filters short-termed interference impulses from this voltage USR and transmits the voltage USR for voltage control to the window comparator FK. In case of low tension voltage (the regulated voltage USR is below a lower range of the window voltage UFU) or in case of excess voltage (the regulated voltage USR is above an upper range window voltage), the window comparator FK causes the input/output circuit EAS to produce the reset signal RES which is transmitted to the micro-computer MR and causes the latter to be in a defined condition. In addition to the reset signal RES, also the blocking signal INH is produced which is transmitted to the actuator driver circuit ATS via the blocking signal output port $INH_{out}$ and there blocks a signal exchange between the micro-computer MR and the actuator AKT. Within the input/output module EAS the blocking signal INH is transmitted to the pump motor relay governing circuit PRA and there blocks control of the pump motor relay PMR, that is, it effects a turn off of the pump motor relay PMR.

Further, the input/output circuit EAS produces, together with the reset signal RES also always a fail safe signal FSS which causes a turn-off of the fail safe relay FSR via the fail safe relay governing circuit FRA so that the switch/circuit contact SK1 of the fail safe relay FSR interrupts the main voltage supply UB of the actuator AKT.

If the window comparator FK registers a voltage USR above the upper window range voltage (USR>UFO), the input/output circuit EAS produces, in addition to the mentioned signals (INH, RES, FSS), the excess-voltage signal ÜS which is transmitted to the voltage regulator SR and causes it to turn off the voltage USR. Thereby, a destruction of the micro-computer MR and of the actuator driver circuit ATS is prevented.

The reset signal RES as well as the excess-voltage signal ÜS are stored in storage devices SPR and SPÜ until the turning off of the main voltage supply UB. A bi-directional connection exists between the micro-computer MR, the actuator driver circuit ATS and the switch amplifier T governing the actuator AKT. The actuator driver circuit ATS therefore controls not only the actuator AKT via the switch amplifier T according to data received by the micro-computer MR, but also returns the signals applied to the actuator AKT, after adjusting their levels to the micro-computer MR.

If the micro-computer MR detects a fault while monitoring the actuator AKT, it controls the input/output circuit EAS such that the latter blocks data transfer between the micro-computer MR and the actuator AKT by means of the blocking signal INH applied to the actuator driver circuit ATS and also turns off the fail safe relay FSR by means of the fail safe signal FSS, and thereby the operation contact SK1 of the fail safe relay FSR interrupts supply of the actuator AKT from the main voltage supply UB.

In the same manner, the micro-computer MR turns the anti-lock brake control system off when there is an exchange of incongruous control signals with a second micro-computer, not depicted in FIG. 3.

In case of malfunctions, the driver is signalled by means of the warning lamp WAL together with the turning off of the fail safe relay FSR that his anti-lock brake control system is not available at that moment.

That is, the input/output circuit EAS governs the warning lamp WAL at the occurrence of a fail safe signal FSS.

This can be done in a most uncomplicated way by means of a rest contact of the fail safe relay FSR or, as depicted in FIG. 3, by means of the warning lamp governing circuit WLA of the input/output circuit EAS which governs the warning lamp WAL via the switch amplifier T4.

In addition, the warning lamp control circuit WLK of the input/output circuit EAS controls the warning lamp current. This arrangement can be constructed as a window comparator in particular, monitoring a voltage proportionate to the warning lamp current. Arranged upstream of the comparator is a low pass filter WFIL which filters out short-term voltage impulses such as the ones caused, for example, by an activating-current impulse of the warning lamp WAL. In case of excess lamp currents, driving of the warning lamp WAL is interrupted.

A similar current control is also provided for governing the fail safe relay FSR and the pump motor relay PMR. As an alternative to the relay current monitoring, respective regulation of the relay current can be provided. Further, monitoring of the switch condition of the respective relays FSR, PMR is provided. For this purpose, the fail safe relay contact control circuit FSK and a pump motor control circuit PMK are provided within the input/output circuit EAS which respectively monitor voltages switched by the relay switch contacts SK1, SK2.

In particular, the pump motor relay PMR cooperates with the pump motor governing circuit PRA within the input/output circuit EAS for governing the pump motor relay PMR and a circuit PRK for controlling the pump motor relay current. The pump motor PM is actuated by means of the pump motor relay switch contact SK2 applied to the main voltage supply UB. The voltage applied to the pump motor PM, actuated by the pump motor relay circuit contact SK2, is monitored by means of the pump motor control circuit PMK. If the pump motor relay control circuit PRK registers an excess pump motor relay current or if the pump motor control circuit PMK registers a faulty voltage at the pump motor PM, the pump motor relay governing circuit PRA turns off not only the pump motor relay PMR via the switch amplifier T5, but also the fail safe relay FSR via the fail safe relay control circuit FRA and the switch amplifier T3 and thereby the voltage supply of the actuator AKT.

Turning off the fail safe relay FSR and thereby the actuator AKT is done also when the fail safe relay governing circuit FRK registers an excess fail safe relay current or if the fail safe relay governing control circuit FSK registers a faulty voltage at the actuator AKT.

Of course, further elements of the anti-lock brake control system may be controlled by the input/output circuit EAS. For this purpose, uncomplicatedly-structured, further component groups need to be integrated into the input/output circuit EAS, substantially corresponding in their structure to the already described circuit components, thereby not requiring a substantially large effort in the circuit arrangement.

Since a number of major electrical values, or factors, are transmitted through the input/output circuits and since these are connected with all important components of the anti-lock brake control system, it is particularly beneficial to arrange these circuits also with control circuits for preset signal transfers of the micro-computers as well as with at least one additional electrical factor, which can switch off the entire or at least safety-relevant portions of the anti-lock brake control system in case of a fault. Thus, external control circuit units in particular are not needed. Therefore, a lower number of components is sufficient, thereby lowering costs and increasing operational safety.

It is particularly beneficial for operational safety to provide a voltage regulator which supplies components of the anti-lock brake control system, that are particularly sensitive towards voltage deviations, with stabilized voltages.

This applies, in particular, to the micro-computers as well as for the actuator driver circuits which generally are supplied with an operational voltage varying from the main voltage supply to be typically 5 volt.

It is further beneficial to arrange the peripheral elements linked to the input/output circuits such that two or more of the same input/output circuits can be used at the same time. Since only one type of input/output circuit is needed, development expenses can be saved in this manner. Further, these several, independently functioning monitoring devices make possible the monitoring of the micro-computers and of the at least one electrical factor, or value, in a redundant manner and thereby with particularly high safety.

It is particularly beneficial if the electrical factor monitored in multiple ways by the input/output circuits is the operational voltage produced by the voltage regulator for the components of the anti-lock brake control system that are particularly sensitive to voltage deviations. This can be done in a most uncomplicated manner by a window comparator within each of the input/output circuits.

Herein it is particularly beneficial to arrange a device for filtering short-termed interference impulses before they reach the window comparators to avoid response to short-termed voltage peaks, which are often found in lines of a motor vehicle.

In case of malfunctions, that is when at least one of the input/output circuits determines too high or too low a voltage applied to the components particularly sensitive to voltage deviations, a switch-off of the entire or at least major portions of the anti-lock brake control system is effected.

Since it cannot be determined ahead of time which portions of the anti-lock brake control system have caused a malfunction, it is particularly beneficial for safety to provide "switching offs" of the anti-lock brake control system in various manners. When, for example, a faulty voltage at the voltage-sensitive components is detected, at least one of the input/output circuits can block the micro-computers by means of a reset signal or block the actuator driver circuits by means of a blocking signal, or can turn off, by means of a relay, the supply voltage. In a preferred embodiment, all three options are provided simultaneously to ensure a switching-off of the actuators in all possible cases of malfunctions. Further, it is particularly beneficial that upon occurrence of too high a voltage at least one of the input/output circuits produces an excess-voltage signal and that the voltage regulator is set up such that, in cases of occurrence of the excess-voltage signal, it switches off the voltage supply of the components of the anti-lock brake control system, which are particularly voltage-sensitive, especially to prevent destruction of these parts if still possible.

It is advisable to store the excess-voltage signal and the reset signal to prevent a re-engagement of the faulty anti-lock brake control system.

Safety of the anti-lock brake control system can be further increased by adding a fail-safe-relay which interrupts in particular the voltage supply of the actuators in case of malfunction.

This ensures a reliable switching-off of the anti-lock brake control system even when actuator driver circuits malfunction and even when the actuator driver circuits transmit faulty control signals to the actuators and when the actuator driver circuits cannot be blocked by blocking signals.

Since this fail safe relay is a particularly safety-relevant part, its function should also be monitored. This can be done in an uncomplicated manner such that at least one of the input/output circuits regulates current flowing through the fail safe relay. A fail safe relay current which is too high also leads to complete or partial switching-off of the anti-lock brake control system.

It is beneficial to include the actuator driver circuit in the monitoring of functions. The actuator driver circuits transmit, for example, the control signals of respectively one micro-computer to actuators, in particular via a switch amplifier. The signal transmitted to the actuators is processed by the actuator driver circuit and transmitted to the other micro-computer after a gain adjustment, or calibration, which controls the correctness of the signal.

The driver of a vehicle equipped with an anti-lock brake control system must be able to rely on it and will trust in the reliability of his anti-lock control system. This trust is justified since the described anti-lock brake control system turns itself off in each possible case of malfunction in a reliable manner, and therefore the driver has at least a normal brake system at his disposal, in any case. Nevertheless, it can also lead to endangerment of passengers when the driver is not informed about a malfunction of the anti-lock brake control system. Particularly disastrous consequences can occur when in difficult circumstances, like, for example, on a wet street, the driver decides to come to a full stop trusting in his anti-lock brake control system when it cannot be activated as a result of its being turned off. Therefore, it is absolutely necessary that the driver be informed of the non-availability of the anti-lock brake control system. For this purpose, a warning device is provided, preferably in the form of a warning lamp, warning the driver of full braking in case of malfunction.

Since the warning lamp is also a particularly safety-relevant part, it is beneficial for at least one of the input/output circuits to control the function of the warning lamp analogously to the relay-current control of other elements.

It is particularly beneficial to construct the input/output circuits such that they can monitor the function of further safety-relevant parts.

Especially beneficial, for example, is the monitoring of the pump motor which provides hydraulic pressure build-up within the brake system as well as the relay which governs the pump motor.

We claim:

1. An apparatus to control an actuator (AKT1, AKT2) of an anti-lock brake control system for a vehicle comprising:

at least first and second micro-computers (MR1, MR2), each of said first and second micro-computers (MR1, MR2) including means for receiving the same rpm-signals (DS1, DS2) as are fed to the other micro-computer, means for analyzing said rpm-signals independently of the other micro-computer and producing control signals (AST1, AST2) corresponding to said rpm-signals, and said micro-computers further including means for comparing said control signals and, in case of disagreement between said control signals, producing fault signals (FS1, FS2) for interrupting operation of the brake pressure actuator (AKT1, AKT2), said first and second micro-computers (MR1, MR2) being supplied with a voltage (USR) of a correct value which is interrupted upon said correct value being exceeded;

said apparatus to control said anti-lock brake control system further comprising first and second substantially structurally identical, integrated, input/output circuits (EAS1, EAS2), each of which includes a control circuit (FRA) for functioning in substantially the same way for respectively monitoring said fault signals (FS1, FS2) of both said first and second micro-computers (MR1, MR2) and for shutting down a portion of the anti-lock brake control system, independently of said other input/output circuit, upon detecting fault signals generated by either of said first and second micro-computers;

wherein is further included a voltage regulator (SR) which supplies components of the anti-lock brake control system with said voltage (USR) of correct value; and wherein each of said first and second input/output circuits (EAS1, EAS2) includes a means (FIL, FK) for controlling the voltage (USR) supplied by the voltage regulator responsive to a magnitude of a voltage control signal of the voltage regulator such that it interrupts the voltage supplied by the voltage regulator to components of the anti-lock brake control system for thereby shutting down at least a portion of the anti-lock brake control system whereby said first and second substantially identical, integrated, input/output circuits provide an additional multi-functional shut down safety stage comprising a plurality of substantially redundant elements.

2. An anti-lock brake control system as in claim 1 wherein at least one of said first and second micro-computers (MR1, MR2) is one of said components of the anti-lock brake control system supplied by said voltage regulator (SR).

3. An anti-lock brake control system as in claim 1 wherein is further included therein at least one actuator driver circuit (ATS1, ATS2), which is one of said components of the anti-lock brake control system supplied by said voltage regulator (SR).

4. An anti-lock brake control system as in claim 1 wherein the magnitude of a voltage (USR) supplied by the voltage regulator (SR) is approximately 5 volts.

5. An anti-lock brake control system as in claim 1 wherein the first and second input/output circuits work substantially independently from one another.

6. An anti-lock brake control system as in claim 1 wherein at least one of the first and second input/output circuits (AES1, AES2) includes a means for controlling a fail-safe-relay (FSR).

7. An anti-lock brake control system as in claim 1 wherein each of the first and second input/output circuits includes at least one window comparator (FK) for monitoring the voltage control signal of the voltage regulator.

8. An anti-lock brake control system as in claim 7 wherein the voltage control signal monitored by the window comparator (FK) of each of the first and second input/output circuits is not identical with an operating voltage of the first and second input/output circuits (EAS1, EAS2).

9. An anti-lock brake control system as in claim 7 wherein is further included in each of said first and second input/output circuits (EAS1, EAS2) at least one filter (FIL) for filtering short-period voltage irregularities arranged upstream of the at least one window comparator (FK).

10. An anti-lock brake control system as in claim 1 wherein one of said portions of the anti-lock brake control system shut down is a pump-motor relay (PMR).

11. An anti-lock brake control system as in claim 1 wherein each of the first and second input/output circuits EAS1, EAS2) produces a blocking signal at the occurrence of a reset signal.

12. An anti-lock brake control system as in claim 1 wherein each of the first and second input/output circuits (EAS1, EAS2) is provided with a blocking signal input terminal ($INH_{in}$) and produces a blocking output signal ($INH_{out}$) when a certain logical signal appears at the blocking signal input terminal ($INH_{in}$), each of the said blocking signal input terminals ($INH_{in}$) being linked to an output terminal (INH) of one of said first and second micro-computers for receiving blocking signals therefrom which are different than said fault signals, said anti-lock brake control system having means for blocking transmission of control signals from said first and second micro-computers to their respective brake pressure actuators (AKT1, AKT2), separately of said fault signals appearing at said fault-signal output terminal in response to said blocking output signals ($INH_{out}$).

13. An anti-lock brake control system as in claim 1 wherein is further included at least one fail safe relay (FSR) coupled to said first input/output circuit (EAS1) which is activated by said first input/output circuit (EAS1) to effect a switching-off of the brake pressure actuators.

14. An anti-lock brake control system as in claim 1 wherein at least one of the first and second input/output circuits (EAS1, EAS2) includes a means for interrupting a voltage supply of the actuators in response to said at least one of the first and second input/output circuit (EAS1, EAS2) producing a reset signal.

15. An anti-lock brake control system as in claim 1 wherein at least one of the first and second input/output circuits (EAS1, EAS2) includes a means (FRA) for interrupting a voltage supply of the actuators when the control signals compared by at least one of the first and second micro-computers are in disagreement and therefore said micro-computers produce said fault signals.

16. An anti-lock brake control system as in claim 1 wherein the actuators are magnetic valves.

17. An anti-lock brake control system as in claim 1 wherein is further included a signalling device (WAL) coupled to at least one of said first and second input/output circuits (EAS1, EAS2) which signals when the anti-lock brake control system is not functional.

18. An anti-lock brake control system as in claim 7 wherein each of the first and second input/output circuits (EAS1, EAS2) includes a means (RES) for producing a reset signal and transferring it to at least the corresponding one of the first and second micro-computers (MR1, MR2) when said voltage control signal monitored by the window-comparator (FK) is outside of a window range determined by said window comparator (FK).

19. An anti-lock brake control system as in claim 7 wherein each of the first and second input/output circuits (EAS1, EAS2) includes a means for producing an excess-voltage signal when said voltage control signal monitored by the window comparator is above the window range of the window comparator.

20. An anti-lock brake control system as in claim 7 wherein each of the first and second input/output circuits (EAS1, EAS2) includes a means for producing an excess-voltage signal when said voltage control signal monitored by the window comparator is greater than a predetermined value for a period longer than a predetermined time period of a filter at the window comparator.

21. An anti-lock brake control system as in claim 18 wherein each of the first and second input/output circuits (EAS1, EAS2) includes a means for sending out the reset signal for a preset period of time after the voltage control signal monitored by the window comparator has returned to a level within the window range.

22. An anti-lock brake control system as in claim 19 wherein is further included a means (US) for causing interruption of the voltage supplied by said voltage regulator to components of the anti-lock brake control system and wherein the excess-voltage signal is applied to said means for interrupting for causing said interruption.

23. An anti-lock brake control system as in claim 18 wherein each of the first and second input/output circuits (EAS1, EAS2) includes a storage means for storing the reset signal until a switching-off of a main power supply.

24. An anti-lock brake control system as in claim 13 wherein the first input/output circuit (EAS1) coupled to said fail safe relay includes a means (FSK) for monitoring the strength of a current through the fail safe relay.

25. An anti-lock brake control system as in claim 24 wherein the first input/output circuit (EAS1) includes a means for determining a fail-safe-relay-current strength by measuring a voltage drop at a resistor.

26. An anti-lock brake control system as in claim 24 wherein the first input/output circuit includes a means (FSS) for switching off the fail safe relay (FSR) when the fail safe relay current exceeds a preset value.

27. An anti-lock brake control system as in claim 24 wherein the first input/output circuit (EAS1) includes a means (FRK) for regulating the fail-safe-relay-current strength to a preset value.

28. An anti-lock brake control system as in claim 13 wherein the first input/output circuit (EAS1) includes a means for monitoring a voltage at a contact of the fail safe relay (FSR).

29. An anti-lock brake control system as in claim 28 wherein said means for monitoring is a window comparator.

30. An anti-lock brake control system as in claim 15 wherein each of the first and second input/output circuits (EAS1, EAS2) is provided with a blocking signal input terminal ($INH_{in}$) and produces a blocking output signal ($INH_{out}$) when a certain logical signal appears at the blocking signal input terminal ($INH_{in}$), each of the said blocking signal input terminals ($INH_{in}$ being linked to an output terminal (INH) of one of said first and second micro-computers (MR1, MR2), which output terminal is separate from an output terminal (FS1, FS2) of said one micro-computer at which said fault signals appear, for receiving blocking signals therefrom, said anti-lock brake control system having means for blocking transmission of control signals from said first and second micro-computers to its respective brake pressure actuator upon receipt of a blocking output signal ($INH_{out}$), said micro-computers causing said input/output circuit to producing said blocking signals in response to fault signals being produced.

31. An anti-lock brake control system as in claim 17 wherein the signalling device signals a switching-off of a fail safe relay (FSR).

32. An anti-lock brake control system as in claim 17 wherein the signalling device is a warning lamp (WAL).

33. An anti-lock brake control system as in claim 17 wherein the at least one of the first and second input/output circuits (EAS1, EAS2) includes a means for monitoring a function of the signalling device (WAL).

34. An anti-lock brake control system as in claim 31 wherein the signalling device is activated by means of a rest contact of the fail safe relay (FSR).

35. An anti-lock brake control system as in claim 33 wherein the at least one of the first and second input/output circuits (EAS1, EAS2) includes a means for monitoring current flowing through the signalling device (WAL).

36. An anti-lock brake control system as in claim 35 wherein the at least one of the first and second input/output circuit (EAS1, EAS2) is provided with a low pass filter for filtering out start-up current impulses of the signalling device.

* * * * *